(12) United States Patent
Han et al.

(10) Patent No.: US 11,270,565 B2
(45) Date of Patent: Mar. 8, 2022

(54) ELECTRONIC DEVICE AND CONTROL METHOD THEREFOR

(71) Applicant: SAMSUNG ELECTRONICS CO., LTD., Suwon-si (KR)

(72) Inventors: Jonghee Han, Suwon-si (KR); Joonho Kim, Suwon-si (KR); Hyunjae Baek, Suwon-si (KR); Dojun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/049,847

(22) PCT Filed: May 13, 2019

(86) PCT No.: PCT/KR2019/005731
§ 371 (c)(1),
(2) Date: Oct. 22, 2020

(87) PCT Pub. No.: WO2019/216732
PCT Pub. Date: Nov. 14, 2019

(65) Prior Publication Data
US 2021/0049890 A1    Feb. 18, 2021

(30) Foreign Application Priority Data
May 11, 2018    (KR) .................. 10-2018-0054035

(51) Int. Cl.
*G06K 9/62* (2006.01)
*G08B 21/04* (2006.01)
(Continued)

(52) U.S. Cl.
CPC ......... *G08B 21/0446* (2013.01); *G06N 20/00* (2019.01); *G08B 21/043* (2013.01); *G08B 29/188* (2013.01)

(58) Field of Classification Search
CPC .............. G08B 21/0446; G08B 21/043; G08B 29/188; G08B 21/0469; G08B 21/04;
(Continued)

(56) References Cited

U.S. PATENT DOCUMENTS

| 8,774,863 B2 | 7/2014 | Park et al. |
| 9,124,710 B2 | 9/2015 | Park et al. |

(Continued)

FOREIGN PATENT DOCUMENTS

| CN | 104468943 A | 3/2015 |
| CN | 104510475 A | 4/2015 |

(Continued)

OTHER PUBLICATIONS

International Search Report dated Aug. 16, 2019 (PCT/ISA/210) issued by the International Searching Authority for International Application No. PCT/KR2019/005731.

(Continued)

*Primary Examiner* — Munear T Akki
(74) *Attorney, Agent, or Firm* — Sughrue Mion, PLLC

(57) ABSTRACT

An electronic device and a control method therefor are disclosed. A control method for an electronic device, according to the present disclosure, enables relearning of an artificial intelligence model for: receiving fall information acquired by a plurality of sensors of an external device when a fall event of a user is sensed by one of the plurality of sensors included in the external device; determining whether the user has fallen by using the fall information acquired by the plurality of sensors; determining a sensor, having erroneously determined that a fall has occurred, from among the plurality of sensors on the basis of whether the user has fallen; and determining that a fall has occurred by using a sensing value acquired by the sensor having erroneously determined that a fall has occurred. In particular, at least one (Continued)

part of a method for acquiring fall information by using a sensing value acquired through a sensor enables the user of artificial intelligence model having learned according at least one of machine learning, a neural network, and a deep-learning algorithm.

15 Claims, 11 Drawing Sheets

(51) Int. Cl.
*G06N 20/00* (2019.01)
*G08B 29/18* (2006.01)

(58) Field of Classification Search
CPC ......... G06N 20/00; G06N 3/08; H04M 1/725; H04M 1/72454; H04M 2201/34
See application file for complete search history.

(56) References Cited

U.S. PATENT DOCUMENTS

| | | | |
|---|---|---|---|
| 9,124,711 | B2 | 9/2015 | Park et al. |
| 9,405,377 | B2 | 8/2016 | Li |
| 9,456,073 | B2 | 9/2016 | Park et al. |
| 9,728,060 | B2 | 8/2017 | Ishii et al. |
| 9,972,187 | B1* | 5/2018 | Srinivasan ......... G08B 21/0492 |
| 10,104,216 | B2 | 10/2018 | Park et al. |
| 10,334,093 | B2 | 6/2019 | Park et al. |
| 10,674,002 | B2 | 6/2020 | Park et al. |
| 2006/0282021 | A1* | 12/2006 | DeVaul ................. A61B 5/1117 600/595 |
| 2008/0129518 | A1* | 6/2008 | Carlton-Foss ......... G08B 25/10 340/573.1 |
| 2008/0274770 | A1 | 11/2008 | Park et al. |
| 2010/0052896 | A1* | 3/2010 | Goodman .......... G08B 21/0446 340/539.11 |
| 2010/0176952 | A1* | 7/2010 | Bajcsy ................. A61B 5/6887 340/573.1 |
| 2011/0077865 | A1* | 3/2011 | Chen ...................... G06F 1/3215 702/3 |
| 2011/0218460 | A1* | 9/2011 | Masuzawa ............... A61B 5/11 600/595 |
| 2012/0245735 | A1* | 9/2012 | Lee ...................... B62D 57/032 700/255 |
| 2014/0313036 | A1 | 10/2014 | Sweeney et al. |
| 2014/0323114 | A1 | 10/2014 | Park et al. |
| 2015/0024690 | A1 | 1/2015 | Park et al. |
| 2015/0334520 | A1 | 11/2015 | Park et al. |
| 2015/0373177 | A1 | 12/2015 | Park et al. |
| 2017/0169699 | A1 | 6/2017 | Will et al. |
| 2017/0172465 | A1 | 6/2017 | Osorio |
| 2017/0300971 | A1 | 10/2017 | Ohta et al. |
| 2019/0020752 | A1 | 1/2019 | Park et al. |
| 2019/0289113 | A1 | 9/2019 | Park et al. |
| 2020/0280627 | A1 | 9/2020 | Park et al. |

FOREIGN PATENT DOCUMENTS

| | | |
|---|---|---|
| CN | 105023022 A | 11/2015 |
| CN | 105357358 A | 2/2016 |
| EP | 2 329 470 A1 | 6/2011 |
| JP | 4307177 B2 | 8/2009 |
| JP | 4668684 B2 | 4/2011 |
| KR | 10-2016-0132988 A | 11/2016 |
| KR | 10-2017-0073966 A | 6/2017 |
| KR | 10-1773898 B1 | 9/2017 |
| KR | 10-2018-0010441 A | 1/2018 |
| KR | 10-2018-0018238 A | 2/2018 |
| KR | 10-2018-0035455 A | 4/2018 |
| WO | 2010/023604 A1 | 3/2010 |

OTHER PUBLICATIONS

Written Opinion dated Aug. 16, 2019 (PCT/ISA/237) issued by the International Searching Authority for International Application No. PCT/KR2019/005731.
Vallejo, Marcela et al., "Artificial Neural Networks as an Alternative to Traditional Fall Detection Methods", Engineering in Medicine and Biology Society (EMBC), 2013 34th Annual International Conference of the IEEE, Jul. 3, 2013, pp. 1648-1651, XP032488747. (4 pages total).
Communication dated Mar. 3, 2021 by the European Patent Office in European Patent Application No. 19800418.6.
Communication dated Dec. 29, 2021 by the China National Intellectual Property Administration in Chinese Patent Application No. 201980031756.3.

* cited by examiner (a)  (b)

ELECTRONIC DEVICE AND CONTROL METHOD THEREFOR

TECHNICAL FIELD

The disclosure relates to an electronic device and a control method thereof. More particularly, the disclosure relates to an electronic device which identifies whether a fall has occurred by a user based on an obtained fall information by using a plurality of sensors included in an external device and a control method thereof.

In addition, the disclosure relates to an artificial intelligence (AI) system that simulates functions such as cognition and determination of a human brain by utilizing a machine learning algorithm and application thereof.

Background Art

Recently, artificial intelligence (AI) systems implementing an intelligence level of a human are being used in various fields. The AI system is a system in which machines self-learn and identify, thus becoming smart unlike rule-based smart systems according to the related art. The AI system may be configured so that the more the AI system is used, the rate of recognition is improved and user preference is more accurately understood, and thus the conventional rule-based smart systems are being gradually substituted with a deep learning-based artificial intelligence system.

The artificial intelligence technology may be comprised of machine learning (e.g., deep learning) and element technologies utilizing the machine learning.

The machine learning may be an algorithm technology that self-classifies and learns features of input data, and element technologies may be a technology which simulates functions such as recognition and identification of the human brain by utilizing machine learning algorithm such as deep learning, and may be comprised in the technical fields of linguistic understanding, visual understanding, inference/prediction, knowledge representation, movement control, and the like.

The various fields that the artificial intelligence technology may be applied are as follows. Linguistic understanding refers to a technology that recognizes human language/character and applies/processes the same, and may include natural language processing, machine translation, dialogue system, questions and answers, speech recognition/synthesis, and the like. Visual understanding refers to a technology that recognizes objects as human vision, and may include object recognition, object tracking, image searching, human recognition, scene understanding, spatial understanding, image enhancement, and the like. Inference/prediction refers to a technology that identifies information and logically infers and predicts the information, and may include knowledge/probability based inference, optimization prediction, preference based planning, recommendation, and the like. Knowledge representation refers to a technology that automatically processes human experience information to knowledge data, and may include knowledge construction (e.g., data generation/classification), knowledge management (e.g., data utilization), and the like. Movement control refers to a technology that controls movement of an autonomous driving of a vehicle, movement of a robot, and the like, and may include movement control (e.g., navigation, collision, driving), manipulation control (e.g., behavior control), and the like.

Recently, a home network system capable of identifying an occurrence of a fall of a user (particularly, seniors or the disabled) by using various sensors are being provided. Services such as an external device including a plurality of sensors transmitting a fall event detected through at least one from among the plurality of sensors to an electronic device (e.g., home hub device), and the electronic device providing information on the fall event of the user to the outside are being provided.

Particularly, the external device may obtain fall information on whether fall has occurred or not by inputting a sensing value obtained through a sensor in the trained artificial intelligence model. The artificial intelligence model may be provided for each sensor. However, there are the problems of obtaining training data for training the artificial intelligence model being difficult, and the training data also showing a significant variation for each individual. That is, due to a lack of training data, if fall information is obtained by using an artificial intelligence model, an erroneous fall event may be detected and a problem of ultimately providing erroneous information to the user may arise.

DISCLOSURE

Technical Problem

The disclosure provides an electronic device which identifies whether or not a fall of a user has occurred through fall information obtained through a plurality of sensors, identifies a sensor that erroneously identified a fall occurring, and provides an accurate fall event to the user by retraining an artificial intelligence model which corresponds to the identified sensor, and a control method thereof.

Technical Solution

According to an embodiment, a control method of an electronic device includes, based on a fall event of a user being detected by at least one from among a plurality of sensors included in an external device, receiving fall information obtained by a plurality of sensors of the external device; identifying whether or not a fall of the user has occurred by using fall information obtained by the plurality of sensors; identifying a sensor that erroneously identified a fall occurring from among the plurality of sensors based on whether or not a fall of the user has occurred; and retraining the artificial intelligence model that identified whether or not a fall has occurred by using a sensing value obtained by the sensor that erroneously identified whether or not the fall has occurred.

The external device may include a first sensor and a second sensor, and the receiving may include, based on a fall event being detected based on at least one from among a second fall information obtained by inputting a first fall information obtained by inputting a sensing value obtained by the first sensor to a first artificial intelligence model and a sensing value obtained by the second sensor to a second artificial intelligence model, receiving the first fall information and the second fall information through the communicator.

The identifying whether or not a fall of the user has occurred may include identifying whether or not a fall of the user has occurred by using fall information obtained by a sensor with high accuracy from among the first sensor and the second sensor.

The identifying whether or not a fall of the user has occurred may include, obtaining information on whether or not an electronic device is in operation in the space the user is located, and identifying whether or not a fall of the user has occurred based on the first fall information, the second fall information and information on whether or not the electronic device is in operation.

The retraining may include, based on the first sensor being identified as the sensor that erroneously identified whether or not a fall has occurred, retraining the first artificial intelligence model, and based on the second sensor being identified as the sensor that erroneously identified whether or not a fall has occurred, retraining the second artificial intelligence model.

The method may include transmitting the retrained artificial intelligence model to the external device.

The method may include transmitting the retrained artificial intelligence model to another external device which includes the sensor that erroneously identified whether or not the fall has occurred.

The plurality of sensors may include at least one from among a video sensor, an ultra-wide band (UWB) radar sensor, an infrared (IR) sensor, and a microphone.

According to an embodiment, an electronic device includes a communicator; a memory including at least one instruction; and a processor coupled to the communicator and the memory and configured to control the electronic device, and the processor is configured to, based on a fall event of a user being detected by one from among a plurality of sensors included in an external device by executing the at least one instruction, receive fall information obtained by a plurality of sensors of the external device through the communicator, identify whether or not a fall of the user has occurred by using the fall information obtained by the plurality of sensors, identify a sensor that erroneously identified whether or not a fall has occurred from among the plurality of sensors based on whether a fall of the user has occurred, and retrain an artificial intelligence model that identifies whether or not a fall has occurred by using a sensing value obtained by the sensor that erroneously identified whether or not the fall has occurred.

The external device may include a first sensor and a second sensor, and the processor may be configured to, based on a fall event being detected based on at least one from among a second fall information obtained by inputting a first fall information obtained by inputting a sensing value obtained by the first sensor to a first artificial intelligence model and a sensing value obtained by the second sensor to a second artificial intelligence model, receive the first fall information and the second fall information through the communicator.

The processor may be configured to identify whether or not a fall of the user has occurred by using a fall information obtained by a sensor with high accuracy from among the first sensor and the second sensor.

The processor may be configured to obtain information on whether or not an electronic device is operation in the space the user is located, and identifying whether or not a fall of the user has occurred based on the first fall information, the second fall information and information on whether or not the electronic device is operation.

The processor may be configured to, based on identifying the first sensor as the sensor that erroneously identified whether or not fall has occurred, retrain the first artificial intelligence mode, and based on identifying the second sensor as the sensor that erroneously identified whether or not a fall has occurred, retrain the second artificial intelligence model.

The processor may be configured to control the communicator to transmit the retrained artificial intelligence model to the external device.

The processor may be configured to control the communicator to transmit the retrained artificial intelligence model to another external device which includes the sensor that erroneously identified whether or not the fall has occurred.

The plurality of sensors may include at least one from among a video sensor, an ultra-wide band (UWB) radar sensor, an infrared (IR) sensor, and a microphone.

According to an embodiment, a non-transitory computer-readable recording medium including a program for executing a control method of an electronic device, the control method includes, based on a fall event of a user being detected by one from among a plurality of sensors included in an external device, receiving fall information obtained by a plurality of sensors of the external device; identifying whether or not a fall of the user has occurred by using the fall information obtained the plurality of sensors; identifying the sensor that erroneously identified whether or not the fall has occurred from among the plurality of sensors based on whether or not a fall of the user has occurred; and retraining an artificial intelligence model that identifies whether or not a fall has occurred by using a sensing value obtained by a sensor that erroneously identified whether or not the fall has occurred.

Effect of Invention

According to various embodiments as described above, an occurrence of a fall by a user may be detected by using an artificial intelligence model optimized for each user.

DETAILED DESCRIPTION OF EXEMPLARY EMBODIMENTS

Figure 1:
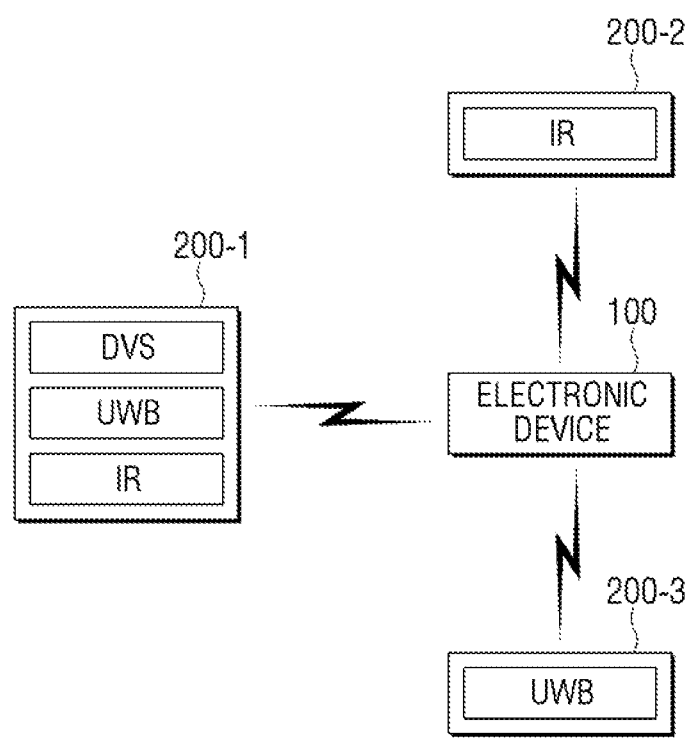
FIG. 1 is a diagram illustrating a system for detecting whether or not a fall has occurred according to an embodiment of the disclosure.

Various embodiments herein will be disclosed with reference to the accompanying drawings. However, it should be noted that the various embodiments are not for limiting the scope of the disclosure to a specific embodiment, but should be interpreted to include all modifications, equivalents or alternatives of the embodiments. With respect to the description of the drawings, like reference numerals may be used for like elements.

Expressions such as "comprise," "may comprises," "include," or "may include" and the like herein may designate a presence of a characteristic (e.g., element such as a number, function, operation or a component), and not preclude a presence of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one of A, (2) at least one of B, or (3) both at least one of A and at least one of B.

Expressions such as "first," "second," "1st," "2nd" or the like used in the disclosure may modify various elements regardless of order and/or importance, and may be used only to distinguish one element from another and not limit the corresponding elements.

When a certain element (e.g., first element) is indicated as being "(operatively or communicatively) coupled with/to" or "connected to" another element (e.g., second element), it may be understood as the certain element being directly coupled with/to the other element or as being coupled through still another element (e.g., third element). On the other hand, when a certain element (e.g., first element) is indicated as "directly coupled with/to" or "connected to" another element (e.g., second element), it may be understood as still another element (e.g., third element) not being present between the certain element and the other element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . ." based on circumstance. The term "configured to . . . (or set up to)" may not necessarily mean "specifically designed to" in terms of hardware. Rather, in a certain circumstance, the expression "a device configured to . . ." may mean something that the device "may perform . . ." together with another device or components. For example, the phrase "a sub-processor configured to (or set up to) perform A, B, and C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

The electronic device according to the various embodiments may include at least one from among, for example, and without limitation, a smartphone, a tablet personal computer (PC), a mobile phone, a video phone, an e-book reader, a desktop PC, a laptop PC, a netbook computer, a work station, a server, a personal digital assistant (PDA), a portable multimedia player (PMP), an MP3 player, a medical device, a camera, or a wearable device. The wearable device may include at least one from among an accessory type (e.g., a watch, a ring, a bracelet, an anklet, a necklace, a pair of glasses, a contact lens or a head-mounted-device (HMD)), a fabric or a garment-embedded type (e.g., an electronic clothing), a body-attached type (e.g., a skin pad or a tattoo), or a bio-implantable circuit. In some embodiments, the electronic device may include at least one from among, for example, and without limitation, a television (TV), a digital video disk (DVD) player, an audio, a refrigerator, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION, etc.), an electronic dictionary, an electronic key, a camcorder, or an electronic frame.

In another embodiment, the electronic device may include at least one from among various medical devices (e.g., various portable medical measurement device (e.g., glucose measuring device, a heart rate measuring device, a blood pressure measuring device, a temperature measuring device, etc.), a magnetic resonance angiography (MRA), a magnetic resonance imaging (MRI), a computed tomography (CT), an imaging device, or an ultrasonic device, etc.) or internet of things device (e.g., light bulbs, various sensors, sprinkler devices, fire alarms, temperature adjusters, street lights, toasters, exercise equipment, hot water tanks, heaters, boilers, etc.).

In this disclosure, the term "user" may refer to a person using the electronic device or a device (e.g., artificial intelligence electronic device) that uses the electronic device.

The disclosure will be described in greater detail below with reference to the drawings.

FIG. 1 is a diagram illustrating the system for detecting whether or not a fall has occurred according to an embodiment of the disclosure. The system may include an electronic device 100 and a plurality of external devices 200-1 to 200-3, as illustrated in FIG. 1.

Each of the plurality of external devices 200-1 to 200-3 may be disposed in a plurality of spaces within the home. For example, the first external device 200-1 may be disposed in the master bedroom, the second external device 200-2 may be disposed in the bathroom, and the third external device 200-3 may be disposed in the living room.

In addition, the each of the plurality of external devices 200-1 to 200-3 may detect a fall event of a user by using at least one sensor. For example, the first external device 200-1 may include a dynamic vision sensor (DVS), an ultra-wide band (UWB) radar sensor, and an infrared (IR) sensor, the second external device 200-2 may include the IR sensor, and the third external device 200-3 may include the UWB(Ultra-Wide Band) radar sensor. The DVS(Dynamic Vision Sensor) may obtain information on a movement of the user by photographing the user. In addition, the UWB radar sensor may detect information on changes in user movement, bio-signals (e.g., respiration, heart beat), and the like by using an ultra-wide band radar. In addition, the IR sensor may detect changes in user movement by using an IR signal. In particular, the accuracy of detecting changes in user movement may be enhanced based on the order of the DVS, the UWB radar sensor, and the IR sensor.

In addition, the each of the plurality of external devices 200-1 to 200-3 may include an artificial intelligence model corresponding to the at least one sensor. The artificial intelligence model may be a model trained to obtain fall information by inputting a sensing value obtained by a sensor. The artificial intelligence model may be provided for each sensor. For example, based on the first external device 200-1 including the DVS, the UWB radar sensor, and the IR sensor, the first external device 200-1 may include a first artificial intelligence model trained to obtain fall information based on the sensing value obtained by the DVS, a second artificial intelligence model trained to obtain fall information based on the sensing value obtained by the UWB radar sensor, and a third artificial intelligence model trained to obtain fall information based on the sensing value obtained by the IR sensor.

The one from among the plurality of external devices 200-1 to 200-3 may detect a fall event of a user by using at least one sensor. For example, based on a user located in the master bedroom moving, the first external device 200-1 may obtain a sensing value according to the user movement by using each of the DVS, the UWB radar sensor, and the IR sensor. Then, the first external device 200-1 may obtain a first fall information, a second fall information, and a third fall information by using the artificial intelligence model corresponding to each of the DVS, the UWB radar sensor, and the IR sensor. The fall information may include not only information on whether or not a fall of the user has occurred, but also information on a location of the fall of the user and a degree of the fall of the user.

Based on identifying that a fall event has been detected based on the fall information. The external device that detected the fall event may output information on the fall event. The external device that detected the fall event may provide the information on the fall event in an auditory feedback (e.g., a beeping sound) or a visual feedback (e.g., an alarm message), but this is merely one embodiment, and may transmit information on the fall event to an external user terminal.

In addition, the external device that detected the fall event may transmit the obtained fall information to the electronic device 100.

The electronic device 100 may identify whether or not a fall of a user has occurred based on the fall information received from the external device. Even if a fall event has been detected by some from among the at least one sensor included in the external device, the user may not actually have fallen, and even if a fall event has not been detected by some from among the at least one sensor included in the external device, the user may have actually fallen. That is, the electronic device 100 may identify whether a fall of the user has occurred based on the fall information.

The electronic device 100 may identify whether the fall of the user has occurred based on an order of sensors with high accuracy. For example, based on the fall information being received from the first external device 200-1, the fall information of "use has not fallen" may be included in the fall information obtained by the DVS, and based on the fall information of "user has fallen" being included in the fall information obtained by the UWB radar sensor, the electronic device 100 may identify whether or not a fall has occurred by using the fall information obtained by the DVS with the high accuracy, Alternatively, based on "user has not fallen" being included in the fall information obtained by at least one from among the plurality of sensors, the electronic device 100 may identify that the user has not fallen.

In addition, the electronic device 100 may obtain information on whether or not the electronic device is in operation in the space the user is located, and identify whether or not a fall of the user has occurred based on the fall information and information on whether or not the electronic device is in operation. That is, even if it is determined as "user has fallen" based on the fall information, if the electronic device is in operation in the space the user is located, the electronic device 100 may determine the user as not fallen.

In addition thereto, the electronic device 100 may identify whether or not a fall has occurred by using various environment information together with the fall information.

The electronic device 100 may identify the sensor that erroneously identified whether or not a fall has occurred from among the plurality of sensors with the at least one based on an identification result of whether or not a fall has occurred. For example, based on the first fall information obtained by the DVS being "user has not fallen" and the second fall information obtained by the UWB radar sensor being "use has fallen", if the electronic device 100 identifies as the user as not fallen, the electronic device 100 may identify the UWB radar sensor as the sensor that erroneously identified whether or not a fall has occurred.

The electronic device 100 may retrain the artificial intelligence model that identifies whether or not a fall has occurred by using the sensing value obtained by the sensor that erroneously identified whether or not a fall has occurred. That is, based on the sensor that erroneously identified whether or not a fall has occurred being the UWB radar sensor, the electronic device 100 may retrain the artificial intelligence model that obtains the fall information by using the sensing value obtained by the UWB radar sensor. That is, the electronic device 100 may update the artificial intelligence model that identifies whether or not a fall has occurred by using the sensing value obtained by the sensor that erroneously identified whether or not a fall has occurred.

The electronic device 100 may transmit the updated artificial intelligence model that detected the fall event to the external device. In addition thereto, the electronic device 100 may transmit the updated artificial intelligence model to another external device which includes a corresponding sensor.

The artificial intelligence model described in the above-described embodiment may, as an identification model trained based on an artificial intelligence algorithm, for example, be a model based on a neural network. The trained artificial intelligence model may be designed to simulate a human brain structure on a computer, and may include a plurality of network nodes which simulate neurons in the human neural network and has weighted value. The plurality of network nodes may respectively form a connection relationship for the neurons to simulate a synaptic activity of a neuron transmitting and receiving a signal through a synapse. In addition, the trained artificial intelligence model may, for example, include a neural network model or a deep learning model developed from a neural network model. The plurality of network nodes in the deep learning model may be positioned at different depths (or, layers) from one another and may transmit and receive data based on a convolution connection relationship. As an example of a trained artificial intelligence model, a deep neural network (DNN), a recurrent neural network (RNN), a bidirectional recurrent deep neural network (BRDNN), and the like may be included, but is not limited thereto.

In addition, the external device 200 and the electronic device 100 may obtain fall information based on the sensing value obtained by the sensor as described above or use a personal assistant program which is an artificial intelligence dedicated program (or, an artificial intelligence agent) to update the artificial intelligence model. The personal assistant program may, as a dedicated program for providing an artificial intelligence (AI)-based service, be executed by a generic-use processor (e.g., CPU) according to the related art or a separate AI dedicated processor (e.g., a graphics processing unit (GPU), etc.).

Based on a predetermined event (e.g., an event that detects a predetermined user movement, etc.) being detected, the artificial intelligence agent of the external device 200 may be operated (or executed). The artificial intelligence agent may obtain the fall information by using the artificial intelligence model based on the obtained sensing value. Then, the electronic device 100 may update the artificial intelligence model that erroneously identified whether or not a fall has occurred by using the artificial intelligence agent.

According to another embodiment, the external device 200 may obtain the sensing value by using the sensor, and transmit the obtained sensing value to the electronic device 100, and the electronic device 100 may obtain the fall information by inputting the sensing value to the artificial intelligence model. The electronic device 100 may retrain the artificial intelligence model that erroneously identified whether or not a fall has occurred from among a plurality of artificial intelligence models.

Accordingly, by updating the artificial intelligence model corresponding to the sensor that erroneously identified whether or not a fall has occurred by the electronic device 100, an artificial intelligence model optimized to the user may be provided and a fall event may be more accurately detected.

Figure 2A:
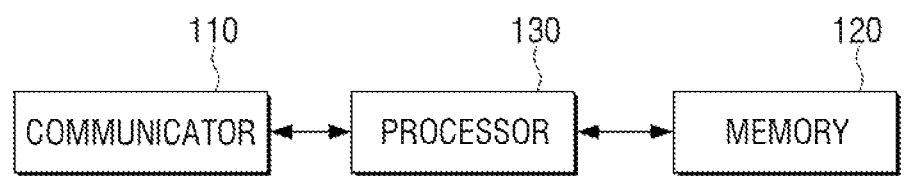
FIGS. 2A and 2B are block diagrams illustrating a configuration of an electronic device according to an embodiment of the disclosure.

FIG. 2A is a block diagram illustrating a schematic configuration of the electronic device according to an embodiment of the disclosure. Referring to FIG. 2A, the electronic device 100 may include a communicator 110, a memory 120, and a processor 130. The configurations illustrated in FIG. 2A are example views for implementing the embodiments of the disclosure, and hardware/software configurations appropriate to a level obvious to those of ordinary skill in the art may be further included in the electronic device 100 or a configuration illustrated in FIG. 2A may be omitted.

The communicator 110 may perform communication with an external other device by using various communication methods. The communicator 110 may receive fall information including information on whether or not a fall of the user has occurred from the external device 200. In addition, the communicator 110 may transmit the updated artificial intelligence model to the external device 200. Further, the communicator 110 may transmit a notification event to the outside based on whether or not a fall of the user has occurred.

The communicator 110 may perform communication with external devices of various types according to a communication method of various types. The communicator 110 may include at least one from among a Wi-Fi chip, a Bluetooth chip, a wireless communication chip, an IR chip, and a ZigBee chip. The processor 130 may perform communication with the external device or other various external devices by using the communicator 110. In addition thereto, the communicator 110 may perform communication with the external device 200 through various communication chips such as a near field communication (NFC) chip.

The memory 120 may store instructions or data related to at least one other element of the electronic device 100. In particular, the memory 120 may be implemented as, for example, and without limitation, a non-volatile memory, a volatile memory, a flash-memory, a hard disk drive (HDD), a solid state drive (SSD), or the like. The memory 120 may be accessed by the processor 130, and a reading/writing/modifying/deleting/updating or the like of data may be performed by the processor 130. The term "memory" may include the memory 120, a read only memory (ROM) (not shown) and a random access memory (RAM) (not shown) within the processor 130, or a memory card (not shown) (e.g., micro SD card, memory stick) mounted to the electronic device 100.

The memory 120 may store artificial intelligence dedicated programs. The artificial intelligence dedicated program may refer to individualized programs to provide various services with respect to the electronic device 100. The artificial intelligence dedicated program may train or retrain the electronic device 100 or the artificial intelligence model based on whether or not a fall of the user has occurred. In addition, according to an embodiment, the memory 120 may store the plurality of artificial intelligence models corresponding to each of the plurality of sensors. The artificial intelligence model may be a model trained to obtain the fall information by inputting the sensing value obtained by the corresponding sensor.

The processor 130 may be electrically coupled with the communicator 110 and the memory 120, and control the overall operation and function of the electronic device 100. The processor 130 may identify whether a fall has occurred from the fall information received from the external device by using various programs (or, instructions) stored in the memory 120, and update the artificial intelligence model that erroneously identified the occurrence of the fall.

Based on a fall event of the user being detected by one from among a plurality of sensors included in the external device 200, the processor 130 may receive the fall information obtained by the plurality of sensors of the external device 200 through the communicator 110, identify whether or not a fall of the user has occurred by using the fall information obtained by the plurality of sensors, identify the sensor that erroneously identified whether or not a fall has occurred from among a plurality of sensors based on whether or not a fall of the user has occurred, and retrain the artificial intelligence model that identifies whether or not a fall has occurred by using the sensing value obtained by the sensor that erroneously identified whether or not a fall has occurred.

Based on the external device 200 including the first sensor and the second sensor, the processor 130 may receive a second fall information obtained by inputting a first fall information obtained by inputting the sensing value obtained by the first sensor to the first artificial intelligence model and the sensing value obtained by the second sensor to the second artificial intelligence model through the communicator 110.

Then, the processor 130 may identify whether or not a fall of the user has occurred by using the fall information obtained by the sensor with high accuracy from among the first sensor and the second sensor. Alternatively, the processor 130 may obtain information on whether or not the electronic device is in operation in the space the user is located, and identify whether or not a fall of the user has occurred based on the first fall information, the second fall information, and information on whether or not the electronic device is in operation.

Based on the first sensor being identified as the sensor that erroneously identified whether or not a fall has occurred, the processor 130 may be configured to retrain the first artificial intelligence model, and based on the second sensor being identified as the sensor that erroneously identified whether or not a fall has occurred, the processor 130 may be configured to retrain the second artificial intelligence model.

The processor 130 may be configured to control the communicator 110 to transmit the retrained artificial intelligence model to the external device 200 or another external device which includes the sensor that erroneously identified whether or not the fall has occurred.

Figure 2B:
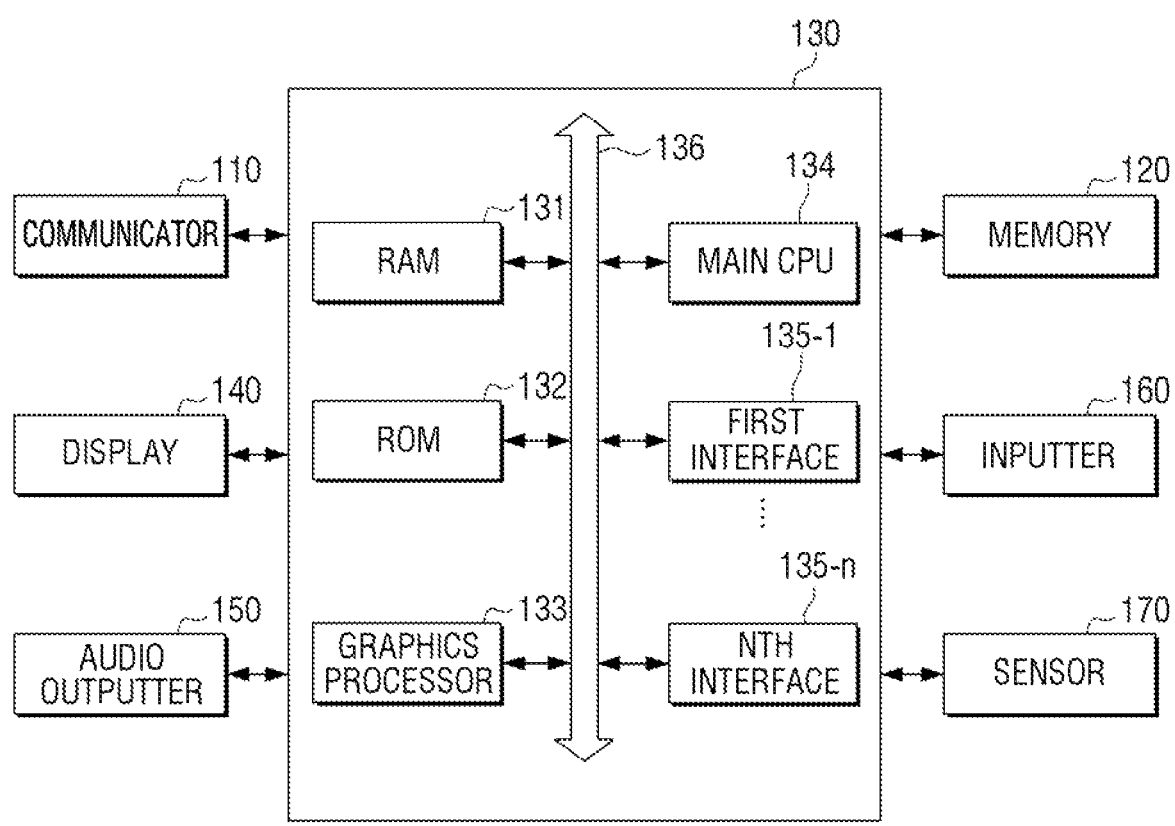

FIG. 2B is a block diagram illustrating a detailed configuration of an electronic device according to an embodiment of the disclosure. Referring to FIG. 2B, the electronic device 100 may include a communicator 110, a display 140, an audio outputter 150, a memory 120, an inputter 160, a sensor 170, and a processor 130. Because the communicator 110 and the memory 120 has been described in FIG. 2A, overlapping descriptions will be omitted.

The display 140 may provide various screens. The display 140 may output an output information on the fall event. The display 140 may display output information on the fall event in a pop-up window form, but this is merely one embodiment, and may display output information on an alarm event in full screen.

The audio outputter 150 may be a configuration for outputting not only various audio data to which various processing work such as decoding or amplification, and noise filtering has been performed by an audio processor (not shown), but also various notification sounds or voice messages. The audio outputter 150 may output an output information on a fall event in an audio form (e.g., beeping sound) by using a speaker 130.

The inputter 160 may receive various user input and transfer to the processor 130. The inputter may include a touch sensor, a (digital) pen sensor, a pressure sensor, a key, or a microphone. The touch sensor may, for example, use at least one method from among a capacitive type, a resistive type, an infrared type, or an ultrasonic wave type. The (digital) pen sensor may, for example, be a part of a touch panel, or include a separate sheet for recognition. The key may, for example, include a physical button, an optical key, or a keypad. The inputter 160 may obtain an input signal according to the user input for executing the artificial intelligence dedicated program.

The sensor 170 may detect various environment information. Based on the electronic device 100 also being a device that detects whether or not a fall of the user has occurred, the sensor 170 may include the DVS, the UWB radar sensor, the IR sensor and the like for detecting user movement, and in addition thereto, may further include a microphone for collecting the user voice, a bio-sensor for collecting biometric data of the user to obtain the fall information of the user.

The processor 130 (or, controller) may be configured to control the overall operation of the electronic device 100 by using various programs stored in the memory 120.

The processor 130 may be comprised of a random access memory (RAM) 131, a read only memory (ROM) 132, a graphics processor 133, a main CPU 134, first to nth interfaces 135-1 to 135-n, and a BUS 136. The RAM 131, the ROM 132, the graphics processor 133, the main CPU 134, the first to nth interfaces 135-1 to 135-n, and the like may be coupled with one another through the BUS 136.

Figure 3:
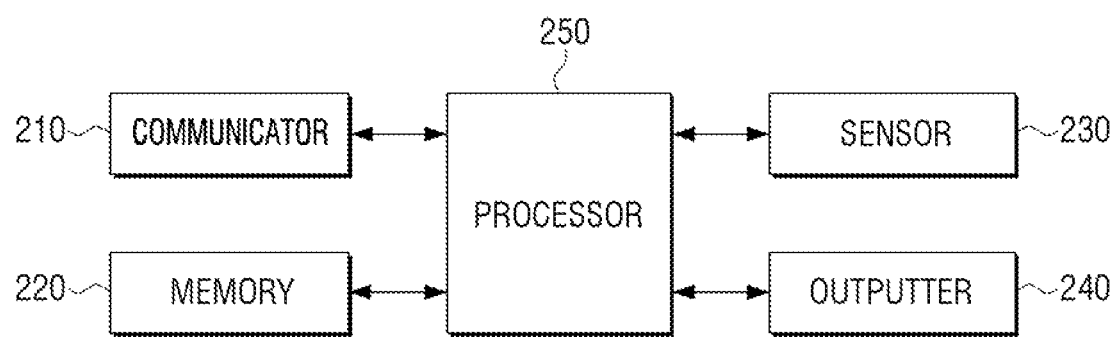
FIG. 3 is a block diagram illustrating a configuration of an external device according to an embodiment of the disclosure.

FIG. 3 is a block diagram illustrating a configuration of the external device according to an embodiment of the disclosure. Referring to FIG. 3, the external device 200 may include a communicator 210, a memory 220, a sensor 230, an outputter 240, and a processor 250. The configurations illustrated in FIG. 3 are example views for implementing embodiments of the disclosure, and hardware/software configurations appropriate to a level obvious to those of ordinary skill in the art may be further included in the external device 200 or a configuration illustrated in FIG. 3 may be omitted. According to an embodiment, the external device 200 may be implemented to an IoT device including a plurality of sensors, but this is merely one embodiment, and may be implemented as home appliances (e.g., TV, etc.) provided within a home.

The communicator 210 may perform communication with the external electronic device 100. The communicator 210 may transmit the fall information obtained by the sensor 230 to the electronic device 100. In addition, the communicator 210 may receive the updated artificial intelligence model from the electronic device 100.

The communicator 210 may perform communication with external devices of various types according to a communication method of various types. For example, the communicator 210 may include at least one from among the Wi-Fi chip, the Bluetooth chip, the wireless communication chip, the IR chip, and the ZigBee chip.

The memory 220 may store instructions or data related to the at least one other element of the external device 200. The memory 220 may be implemented as a non-volatile memory, a volatile memory, a flash-memory, a hard disk drive (HDD), a solid state drive (SSD), or the like. The memory 220 may be accessed by the processor 250, and a reading/writing/modifying/deleting/updating or the like of data may be performed by the processor 250. The term "memory" may include the memory 220, the ROM (not shown) and the RAM (not shown) within the processor 250, or the memory card (not shown) (e.g., micro SD card, memory stick) mounted to the external device 200.

The memory 220 may store artificial intelligence dedicated programs. The artificial intelligence dedicated program may refer to individualized programs to provide various services with respect to the external device 200. The artificial intelligence dedicated program may obtain the fall information by inputting the sensing value obtained through the sensor 230 to the artificial intelligence model.

According to an embodiment, the memory 220 may store the plurality of artificial intelligence models corresponding to each of the plurality of sensors. The artificial intelligence model may be a model trained to obtain the fall information by inputting the sensing value obtained by the corresponding sensor. For example, the memory 220 may include the first artificial intelligence model trained to obtain fall information by inputting the sensing value obtained through the DVS, the second artificial intelligence model trained to obtain fall information by inputting the sensing value obtained through the UWB radar sensor, and the third artificial intelligence model trained to obtain fall information by inputting the sensing value obtained through the IR sensor.

The sensor 230 may obtain the sensing value for obtaining the fall information of the user. The sensor 230 may include the DVS, the UWB radar sensor, the IR sensor, the microphone, the bio-sensor, or the like to detect the movement of the user, the voice of the user, the biometric information of the user, and the like. The sensor 230 may be included in the external device 200 according to the space the external device 200 is located. For example, the UWB radar sensor, the IR sensor, or the like may be included in a space (e.g., master bedroom, bathroom, etc.) which requires privacy protection for the user in the home, and the DVS, the microphone, or the like may be included in a space (e.g., living room, kitchen, etc.) which is used by several users in the home. In addition, with respect to the DVS, the processor 250 may obtain a sensing value on the movement of the user by extracting a contour of the user from among the images photographed through image processing.

The outputter 240 may provide an output information on the fall event. The outputter 240 may be implemented as a display for providing visual feedback or a speaker for providing an auditory feedback, or the like.

The processor 250 (or, controller) may be configured to control the overall operation of the external device 200 by using various programs stored in the memory 220.

The processor 250 may be configured to obtain fall information by inputting the sensing value obtained through the sensor 230 to the artificial intelligence model. The processor 250 may obtain the sensing value for each of the plurality of sensors, and obtain the fall information for each of the plurality of sensors by inputting the sensing value to the plurality of artificial intelligence models corresponding to each of the plurality of sensors. Then, the processor 250 may be configured to transmit the obtained fall information to the electronic device 100.

Figure 4:
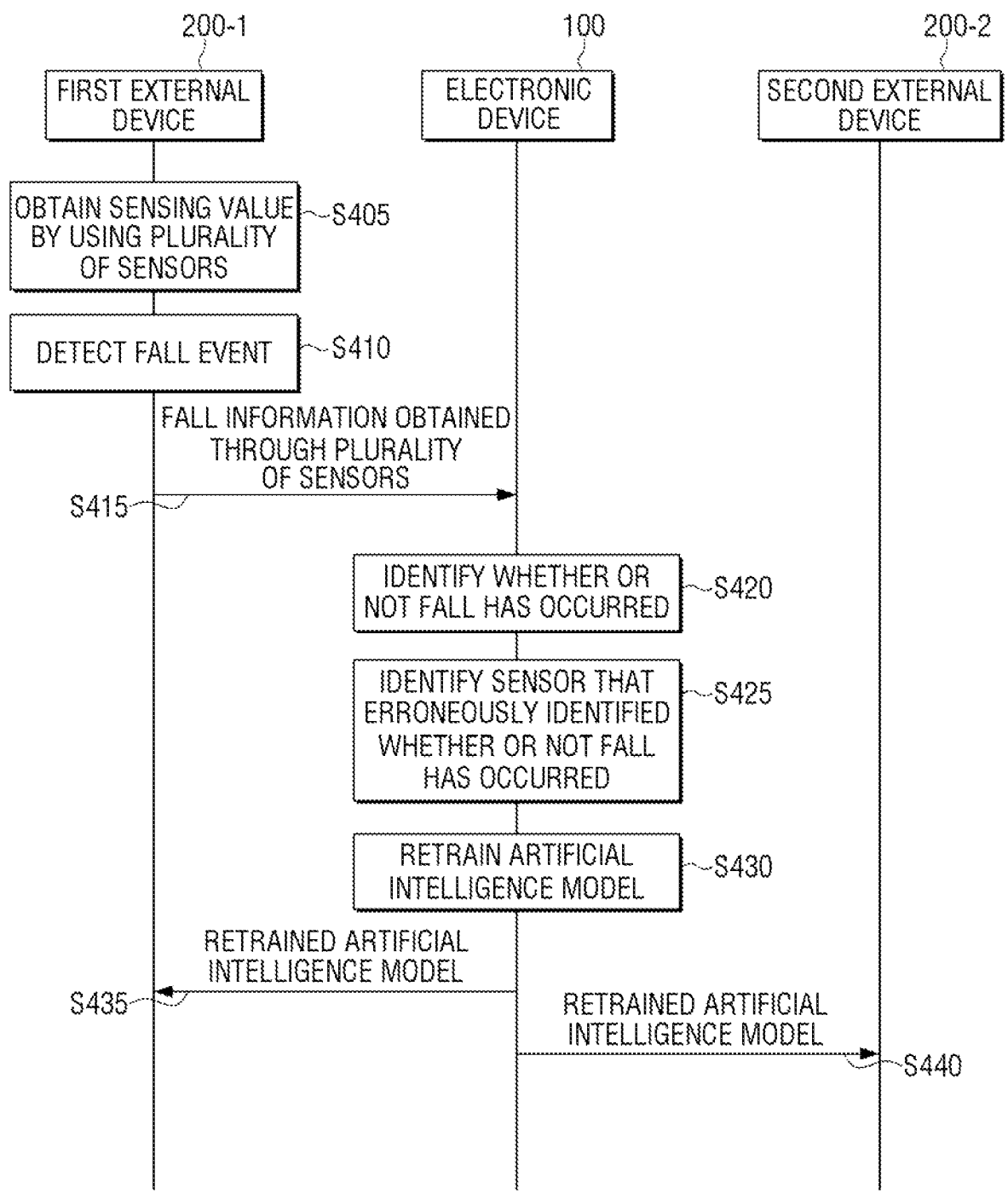
FIG. 4 is a sequence diagram illustrating a method of detecting whether or not a fall of a user has occurred and updating an artificial intelligence model according to an embodiment of the disclosure.

FIG. 4 is a sequence diagram illustrating a method of detecting whether or not the fall of the user has occurred and updating the artificial intelligence model according to an embodiment of the disclosure.

The first external device 200-1 may obtain a sensing value by using the plurality of sensors S405. For example, the first external device 200-1 may obtain the sensing value by using each of the DVS, the UWB radar sensor, the IR sensor, and the microphone. The first external device 200-1 may obtain the sensing value without fail by using the plurality of sensors, but this is merely one embodiment, and based on the movement of the user of a threshold value or more being detected, the first external device 200-1 may obtain the sensing value by using the plurality of sensors.

The first external device 200-1 may detect a fall event S410. The first external device 200-1 may obtain fall information by inputting the sensing values obtained from the plurality of sensors to the corresponding artificial intelligence model. If fall information of "user has fallen" from among the fall information obtained from the plurality of artificial intelligence model is included, the first external device 200-1 may detect the fall event.

The first external device 200-1 may transmit the fall information obtained through the plurality of sensors to the electronic device 100 S415.

The electronic device 100 may identify whether or not a fall of the user has occurred based on the fall information obtained from the first external device 200-1 S420. Based on the information of "user has fallen" being included in all the fall information obtained from the first external device 200-1, the electronic device 100 may identify the user as fallen. However, even if the information of "user has fallen" is included in all the fall information obtained from the first external device 200-1, if environment information such as the user is operating another device is obtained, the electronic device 100 may identify the user as not fallen. In addition, based on information of "user has fallen" being included in some from among the fall information obtained from the first external device 200-1 and information of "user has not fallen" being included in some other from among the fall information, the electronic device 100 may identify whether or not a fall has occurred base on the sensor with high accuracy. Alternatively, the electronic device 100 may, based on information of "user has not fallen" being included in some from among the fall information obtained from the first external device 200-1, identify that the user has not fallen.

The electronic device 100 may identify the sensor that erroneously identified whether or not a fall has occurred based on the identification result of whether or not a fall of the user has occurred S425. For example, based on the user being identified as not fallen, the electronic device 100 may identify the sensor corresponding to the artificial intelligence model that identified the user as fallen.

The electronic device 100 may retrain the artificial intelligence model corresponding to the sensor that erroneously identified whether or not a fall has occurred S430. For example, based on the artificial intelligence model corresponding to the UWB radar sensor obtaining fall information including the erroneous fall or not information, the electronic device 100 may retrain and update the artificial intelligence model corresponding to the UWB radar sensor.

Then, the electronic device 100 may transmit the retrained artificial intelligence model to each of the first external device 200-1 and the second external device 200-2 S435 and S440. The second external device 200-2 may include the artificial intelligence model which obtained the fall information with the erroneous fall or not information.

Through the method as described above, the electronic device 100 may more accurately detect whether or not a fall of the user has occurred by updating to an artificial intelligence model optimized to the user.

Figure 5:
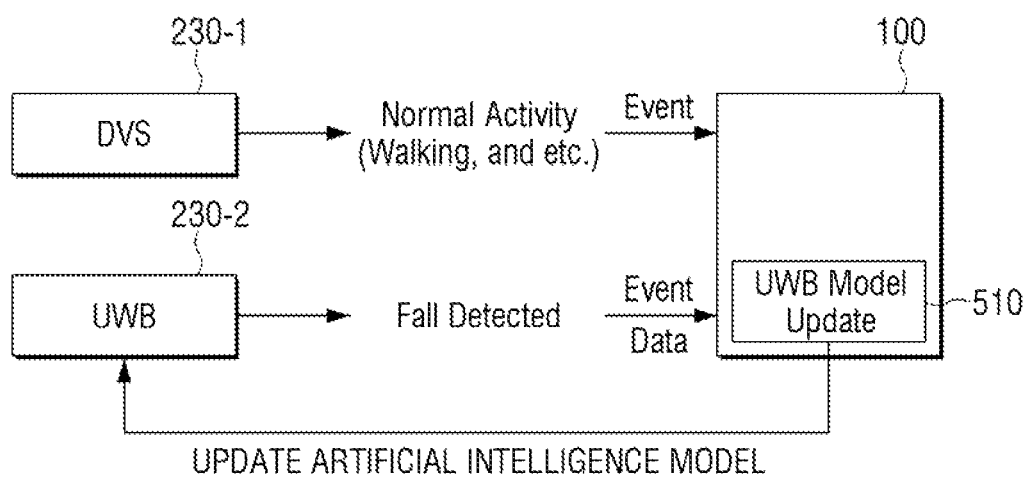
FIGS. 5 and 6 are diagrams illustrating a method of updating an artificial intelligence model according to an embodiment of the disclosure.
Figure 6:
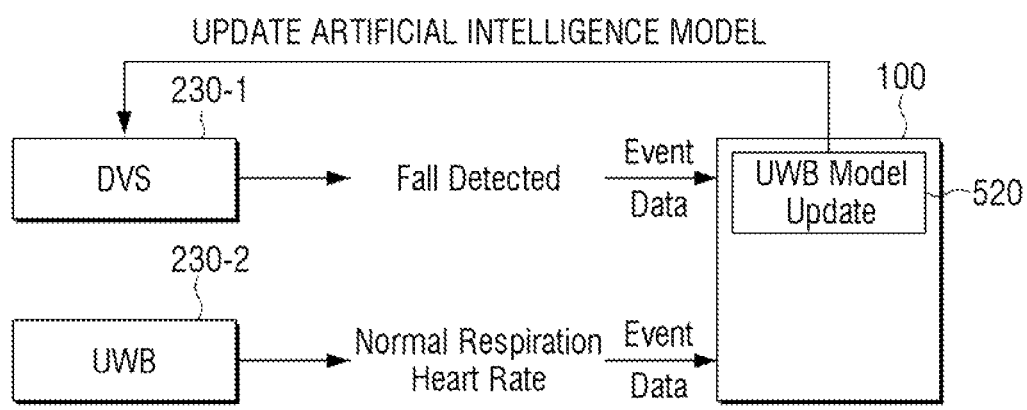

FIGS. 5 and 6 are diagrams illustrating a method of updating the artificial intelligence model according to an embodiment of the disclosure. The external device may include a DVS 230-1 and a UWB radar sensor 230-2.

According to an embodiment, as in FIG. 5, the external device 200 may obtain a fall information of "normal activity" by inputting a sensing value obtained through the DVS 230-1 to the first artificial intelligence model, and obtain a fall information of "fall detected" by inputting a sensing value obtained through the UWB radar sensor 230-2 to the second artificial intelligence model.

Because on the external device 200 detected a fall event through the fall information obtained through the UWB radar sensor, the external device 200 may transmit the obtained fall information to the electronic device 100.

The electronic device 100 may identify whether or not a fall of the user has occurred based on the obtained fall information. The electronic device 100 may identify that the user has not fallen and is performing daily functions based on the fall information obtained through the DVS 230-1 with high accuracy.

The electronic device 100 may retrain the artificial intelligence model 510 corresponding to the UWB radar sensor 230-2 by identifying that the fall information obtained through the UWB radar sensor 230-2 was erroneous. The electronic device 100 may update the artificial intelligence model 510 included in the external device 200 by transmitting the retrained artificial intelligence model to the external device 200.

According to another embodiment, as in FIG. 6, the external device 200 may obtain a fall information of "fall detected" by inputting a sensing value obtained through the DVS 230-1 to the first artificial intelligence model, and obtain a fall information of "normal respiration/heart beat" by inputting a sensing value obtained through the UWB radar sensor 230-2 to the second artificial intelligence model.

Because the external device 200 detected the fall event through the fall information obtained through the DVS 230-1, the external device 200 may transmit the obtained fall information to the electronic device 100.

The electronic device 100 may identify whether or not a fall of the user has occurred based on the obtained fall information. Although information that the user has fallen may be included in the fall information obtained through the DVS 230-1 with high accuracy, because information that the user has not fallen is included in the fall information obtained through the UWB radar sensor 230-2, the electronic device 100 may obtain other environment information (e.g., whether or not the electronic device is being used in the space the external device 200 is located, etc.). Based on the user being identified as not fallen based on the other environment information, the electronic device 100 may identify the user as not fallen.

The electronic device 100 may retrain the artificial intelligence model 520 corresponding to the DVS 230-1 by identifying that the fall information obtained through the DVS 230-1 was erroneous. The electronic device 100 may update the artificial intelligence model 520 included in the external device 200 by transmitting the retrained artificial intelligence model to the external device 200.

Figure 7:
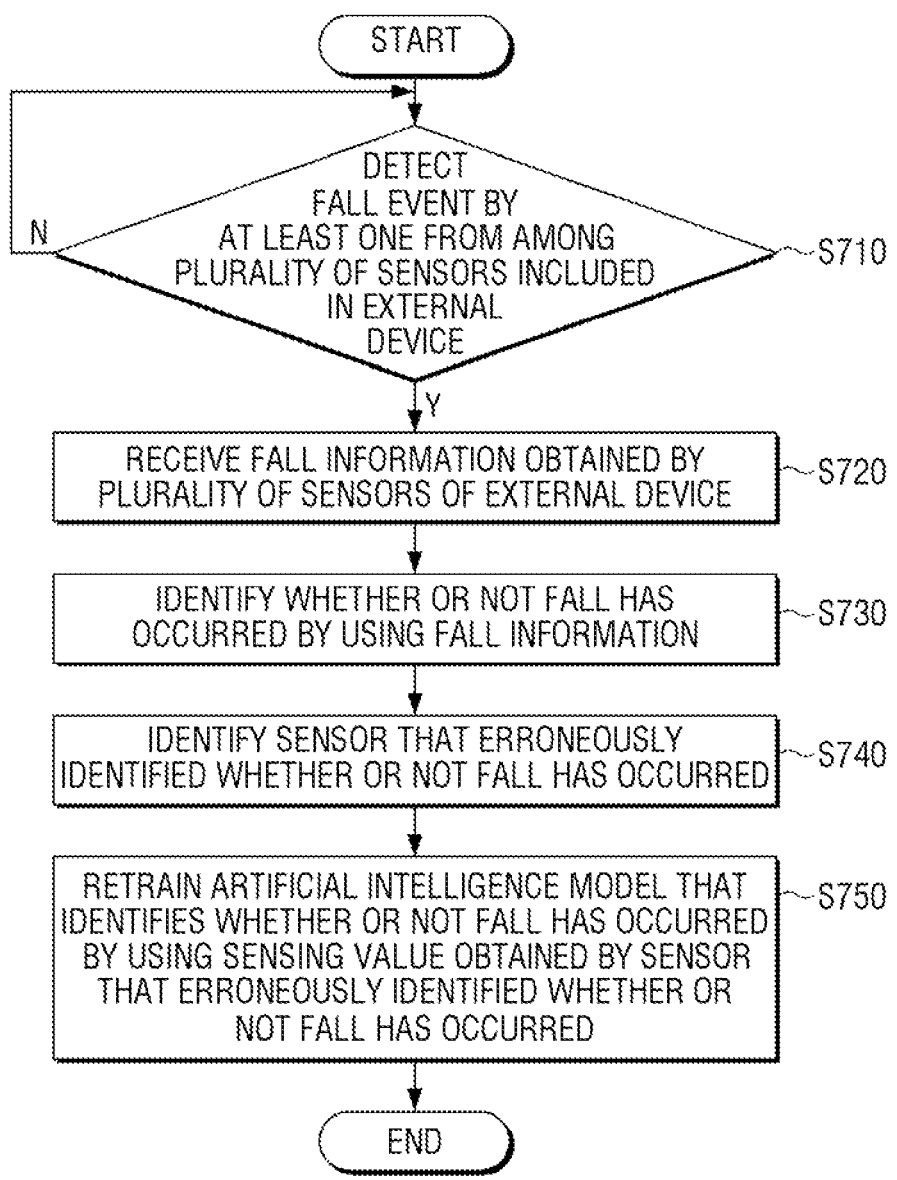
FIG. 7 is a flowchart illustrating a control method of an electronic device according to an embodiment of the disclosure.

FIG. 7 is a flowchart illustrating a control method of the electronic device according to an embodiment of the disclosure.

First, based on a fall event being detected by at least one from among the plurality of sensors included in the external device 200 S710-Y, the electronic device 100 may receive fall information obtained by the plurality of sensors of the external device 200 S720. The received fall information may be information obtained by inputting the sensing value obtained by each of the plurality of sensors to the artificial intelligence model.

The electronic device 100 may identify whether or not a fall has occurred by using the fall information S730. The electronic device 100 may identify whether or not a fall of the user has occurred based on the sensor with high accuracy, and identify whether or not a fall of the user has occurred based on the various environment information in addition to the fall information received from the external device 200.

The electronic device 100 may identify the sensor that erroneously identified whether or not a fall has occurred based on the identification result of whether or not a fall of the user has occurred S740. For example, based on the user being identified as not fallen, the electronic device 100 may identify the sensor corresponding to artificial intelligence model which obtained the fall information of the user having fallen.

The electronic device 100 may retrain the artificial intelligence model that identifies whether or not a fall has occurred by using the sensing value obtained by the sensor that erroneously identified whether or not a fall has occurred S750.

In the above-described embodiment, all of the plurality of sensors have been described as being included in one external device 200, but this is merely one embodiment, and the plurality of sensors may be individually included in the plurality of external devices located in the same space.

In addition, in the above-described embodiment, the electronic device 100 and the external device 200 has been described as being implemented as separate devices, but this is merely one embodiment, and the electronic device 100 and the external device 200 may be implemented as one device. That is, based on the electronic device 100 and the external device 200 being implemented as one device, the one device may identify fall information by directly obtaining the sensing value, and retrain the artificial intelligence model that erroneously identified the fall information.

In addition, in the above-described embodiment, the artificial intelligence model is described as being included in the external device 200 and obtaining fall information, but this is merely one embodiment, and the external device 200 may transmit the obtained sensing value to the electronic device 100 and the electronic device 100 may obtain the fall information.

Figure 8:
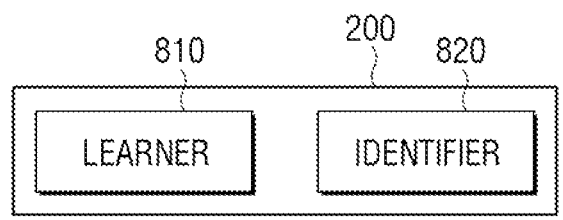
FIG. 8 is a block diagram illustrating a configuration of an electronic device for training and using an artificial intelligence model according to an embodiment of the disclosure.

FIG. 8 is a block diagram illustrating a configuration of the external device 200 for training and using the artificial intelligence model according to an embodiment of the disclosure.

Referring to FIG. 8, the external device 200 may include at least one from among a learner 810 and an identifier 820.

According to an embodiment, in the embodiment of the electronic device 100 obtaining the fall information, the external device 200 of FIG. 8 may be implemented as the electronic device 100.

The learner 810 may generate or train an artificial intelligence model with a criterion for obtaining fall information by using training data. Alternatively, the learner 810 may generate an artificial intelligence model with an identification criterion by using the collected training data.

In an example, the learner 810 may generate, train or update the artificial intelligence model to obtain fall information on whether or not a fall of the user has occurred by using the sensing value detected by the external device 200 as training data. The learner 810 may generate, train, or update the different artificial intelligence models for each sensor.

The identifier 820 may obtain fall information by using the sensing value obtained by the sensor as input data for the trained artificial intelligence model. In an example, the identifier 820 may obtain (or, presume, infer) fall information including information on whether or not a fall of the user has occurred by using the sensing value obtained by the sensor as input data.

According to an embodiment, the learner 810 and the identifier 820 may be included in the external device, but this is merely one embodiment, and at least some of the learner 810 and the identifier 820 may be mounted inside the electronic device 100. Particularly, at least some of the learner 810 and at least some of the identifier 820 may be implemented as software modules or manufactured to at least one hardware chip form and mounted in the external device 200 or the electronic device 100. For example, at least one from among the learner 810 and the identifier 820 may be manufactured in the form of a hardware chip dedicated to an artificial intelligence (AI), or manufactured as a part of generic-use processor (e.g., a CPU or an application processor) according to the related art or a graphics-only processor (e.g., a GPU), and may be mounted on the external device 200 or the electronic device 100 described above. Herein, the hardware chip dedicated for artificial intelligence may be a dedicated processor for probability calculation, which exhibits higher parallel processing performance than the generic-purpose processors according to the related art, and may quickly process computation tasks in the field of artificial intelligence such as machine learning. When the learner 810 and the identifier 820 are implemented with a software module (or, a program module including instructions), the software module may be stored in a computer-readable non-transitory computer readable media. In this case, the software module may be provided by an operating system (OS) or by a predetermined application. Alternatively, some of the software modules may be provided by an OS, and the remaining some may be provided by a predetermined application.

The learner 810 and the identifier 820 may be mounted in one electronic device, or may be respectively mounted in separate electronic devices. For example, one from among the learner 810 and the identifier 820 may be included in the electronic device 100, and the remaining other may be included in the external device 200. In addition, the learner 810 and the identifier 820 may, through a wired or wireless method, provide a model information constructed by the learner 810 to the identifier 820, or the data input to the learner 810 may be provided to the learner 810 as additional training data. In addition, a part from among the learner 810 and the identifier 820 may be included in a separate external server other than the electronic device 100 and the external device 200.

Figure 9A:
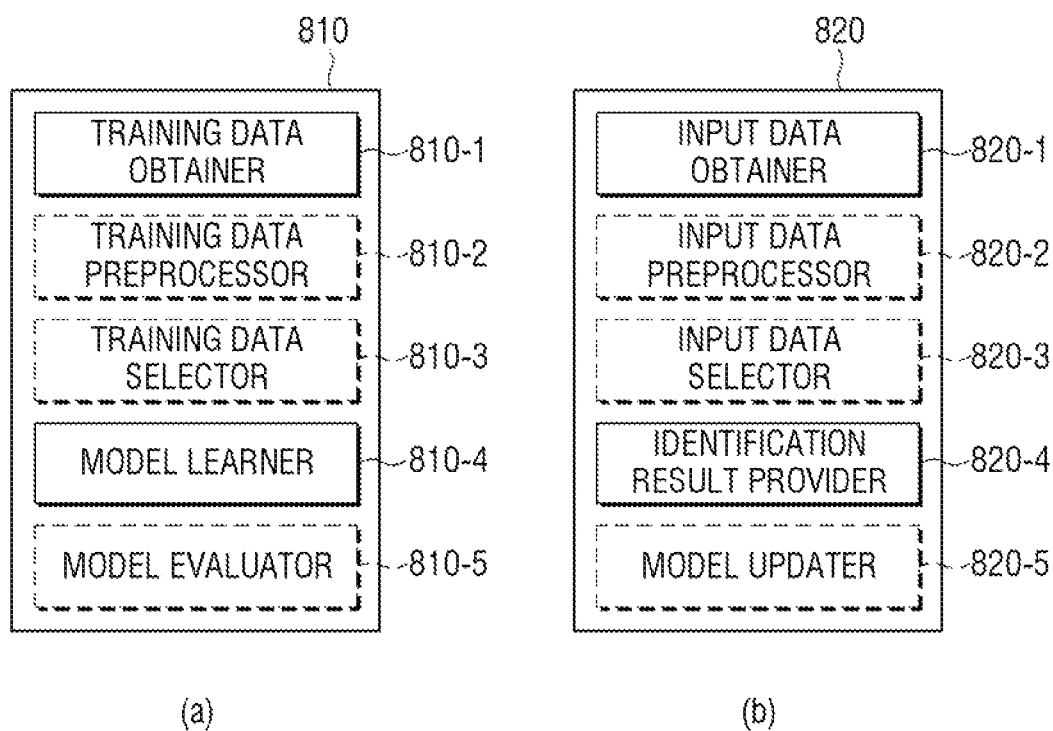
FIGS. 9A and 9B are block diagrams illustrating a detailed configuration of a learner and an identifier according to an embodiment of the disclosure.

FIG. 9A is block diagram illustrating the learner 810 and the identifier 820 according to various embodiments.

Referring to FIG. 9A, the learner 810 according to some embodiments may include a training data obtainer 810-1 and a model learner 810-4. In addition, the learner 810 may selectively further include at least one from among a training data preprocessor 810-2, a training data selector 810-3, and a model evaluator 810-5.

The training data obtainer 810-1 may obtain training data necessary to the artificial intelligence model for obtaining fall information. In an embodiment, the training data obtainer 810-1 may obtain the sensing value obtained by the sensor provided in the external device 200, the sensing value obtained by the electronic device, or the like as training data.

The model learner 810-4 may, by utilizing the training data, train the artificial intelligence model to have a criterion for obtaining fall information. In an example, the model learner 810-4 may train the artificial intelligence model through supervised learning, which utilizes at least some from among the training data as a criterion for obtaining fall information. Alternatively, the model learner 810-4 may, for example, by training on its own using the training data without particular supervision, train the artificial intelligence model through unsupervised learning, which discovers a criterion for obtaining the fall information. In addition, the model learner 810-4 may, for example, train the artificial intelligence model through reinforcement learning, which utilizes feedback on whether the identification result according to training was correct. Further, the model learner 810-4 may, for example, train the artificial intelligence model by utilizing a learning algorithm and the like including error back-propagation or gradient descent.

In addition, the model learner 810-4 may learn a selection criterion on which training data to use for obtaining fall information by using the input data or a selection criterion on which training data to use for obtaining output information of an event.

The model learner 810-4 may, based on a pre-constructed artificial intelligence model being present in plurality, identify the artificial intelligence model with a high relevancy between the input training data and a basic training data as the artificial intelligence model to train. The basic training data may be pre-classified according to the type of data, and the artificial intelligence model may be pre-constructed according to the type of data. For example, the basic training data may be pre-classified according to various criterion such as, for example, and without limitation, an area where the training data is generated, time at which the training data is generated, a size of training data, a genre of training data, a creator of the training data, a type of object within the training data, or the like.

In addition, the model learner 810-4 may train or generate different artificial intelligence models for each sensor.

Based on the artificial intelligence model being trained, the model learner 810-4 may store the trained artificial intelligence model. The model learner 810-4 may store the trained artificial intelligence model in the memory of the external device 200. Alternatively, the model learner 810-4 may store the trained artificial intelligence model in a server coupled with the external device 200 via a wired or a wireless network or in the memory of the electronic device 100.

The learner 810 may enhance the identification result of the artificial intelligence model, or further include the training data preprocessor 810-2 and the training data selector 810-3 to reduce on resources or time which is necessary in the generation of the artificial intelligence model.

The training data preprocessor 810-2 may, in order for the obtained data (e.g., sensing value) to be used in the training for obtaining fall information, preprocess the obtained data. The training data preprocessor 810-2 may process the obtained data to a pre-set format so that the obtained data may be used for the model learner 810-4 to obtain fall information. In addition, the training data preprocessor 810-2 may process the image input to protect user privacy and obtain an image with only contour remaining.

The training data selector 810-3 may select data necessary in training from among the data obtained in the training data obtainer 810-1 or the data preprocessed in the training data preprocessor 810-2. The selected training data may be provided to the model learner 810-4. The training data selector 810-3 may select the training data necessary in training from among the obtained or preprocessed data based on a pre-set selection criterion. In addition, the training data selector 810-3 may select training data according to the pre-set selection criterion by the model learner 810-4 training.

The learner 810 may further include the model evaluator 810-5 to enhance the identification result of the artificial intelligence model.

The model evaluator 810-5 may input evaluation data to the artificial intelligence model, and if the identification result output from the evaluation data does not satisfy a predetermined criterion, the model evaluator 810-5 may have the model learner 810-4 to train again. The evaluation data may be a pre-defined data for evaluating the artificial intelligence model.

For example, the model evaluator 810-5 may, from among the identification results of the trained artificial intelligence model with respect to the evaluation data, evaluate as not satisfying the predetermined criterion when the identification result exceeds a number or a ratio of evaluation data in which the identification result is not accurate.

Based on the trained artificial intelligence model being present in plurality, the model evaluator 810-5 may evaluate whether a predetermined criterion is being satisfied with respect to each of the plurality of trained artificial intelligence models, and identify the model which satisfies the predetermined criterion as the final artificial intelligence model. Based on the model satisfying the predetermined criterion being in plurality, the model evaluator 810-5 may identify a pre-set any one or a predetermined number of models in the order of the highest evaluation scores as the final artificial intelligence model.

Referring to FIG. 9A (b), the identifier 820 according to some embodiments may include an input data obtainer 820-1 and an identification result provider 820-4.

In addition, the identifier 820 may selectively further include at least one from among an input data preprocessor 820-2, an input data selector 820-3, and a model updater 820-5.

The input data obtainer 820-1 may obtain data to obtain fall information. The identification result provider 820-4 may obtain fall information by applying input data obtained from the input data obtainer 820-1 to the trained artificial intelligence model as input value. The identification result provider 820-4 may obtain an identification result by applying data selected by the input data preprocessor 820-2 which will be described hereafter or the input data selector 820-3 to the artificial intelligence model as an input value.

In an embodiment, the identification result provider 820-4 may obtain fall information by applying data (i.e., sensing value) obtained from the input data obtainer 820-1 to the trained artificial intelligence model.

The identifier 820 may either enhance the identification result of the artificial intelligence model, or further include the input data preprocessor 820-2 and the input data selector 820-3 to reduce on resources or time for the providing of the identification result.

The input data preprocessor 820-2 may preprocess the obtained data for the data obtained for obtaining fall information to be used. The input data preprocessor 820-2 may process the obtained data to a pre-defined format for the identification result provider 820-4 to be able to use data obtained for obtaining fall information.

The input data selector 820-3 may select data necessary in identifying from among the data obtained in the input data obtainer 820-1 or the preprocessed data in the input data obtainer 820-1. The selected data may be provided to the identification result provider 820-4. The input data selector 820-3 may, based on a pre-set selection criterion for identifying, select a part or all from among the obtained or preprocessed data. In addition, the input data selector 820-3 may select data according to a selection criterion pre-set by training by the model learner 810-4.

The model updater 820-5 may, based on an evaluation on the identification result provided by the identification result provider 820-4, control for the artificial intelligence model to be updated. For example, the model updater 820-5 may, by providing the identification result provided by the identification result provider 820-4 to the model learner 810-4, request for the model learner 810-4 to further train or update the artificial intelligence model. The model updater 820-5 may retrain the artificial intelligence model based on the feedback information according to the user input.

Figure 9B:
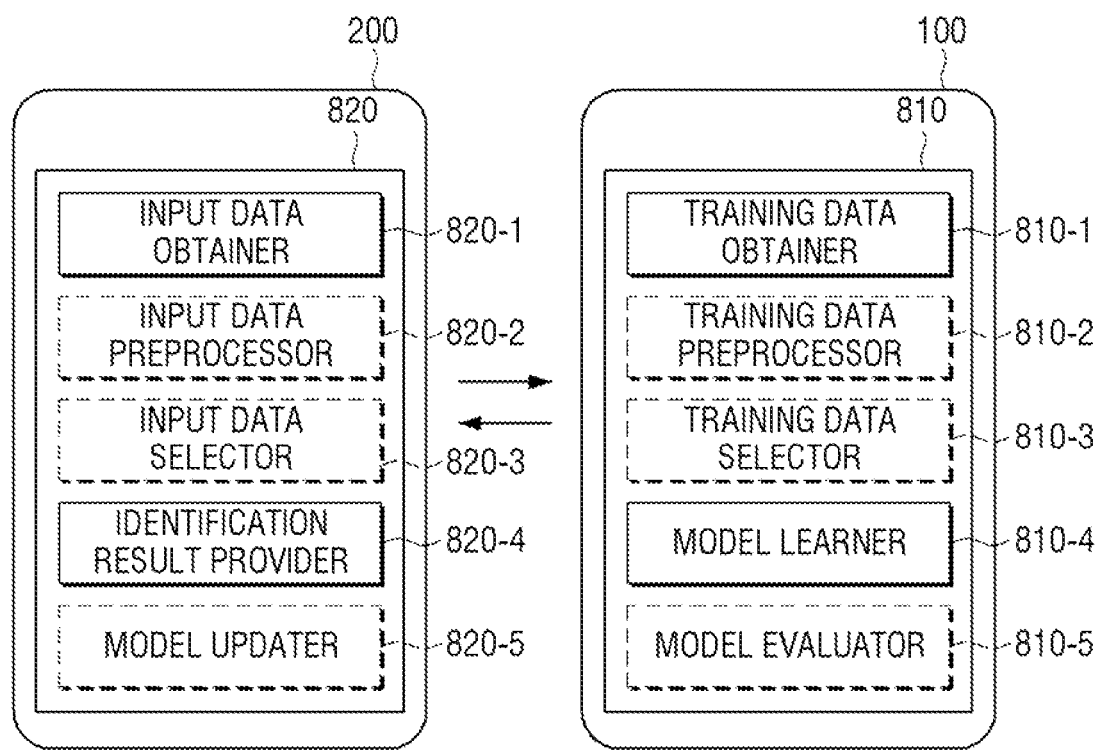

FIG. 9B is a diagram illustrating an example of the external device 200 and the electronic device 100 learning and identifying data by interacting with one another.

Referring to FIG. 9B, the electronic device 100 may learn the criterion for obtaining fall information, and the external device 200 may provide the criterion through the fall information based on the learning result by the electronic device 100.

The model learner 810-4 of the electronic device 100 may perform a function of the learner 810 illustrated in FIG. 8. That is, the model learner 810-4 of the electronic device 100 may learn a criterion on how to obtain a fall information by using a sensing value.

In addition, the identification result provider 820-4 of the external device 200 may obtain fall information by applying data selected by the input data selector 820-3 to the artificial intelligence model generated by the electronic device 100. Alternatively, the identification result provider 820-4 of the external device 200 may receive the artificial intelligence model generated by the electronic device 100 from the electronic device 100, and obtain fall information by using the received artificial intelligence model.

In addition, the electronic device 100 may retrain the artificial intelligence model that identified the erroneous fall information and transmit to the external device 200.

In the above-described embodiment, the electronic device 100 has been described as training/generating the artificial intelligence model, but this is merely one embodiment, and an external separate server S may train/generate the artificial intelligence model, and the electronic device 100 may retrain the artificial intelligence model.

One or more embodiments may be implemented with software including instructions stored in a machine-readable storage media (e.g., computer). The machine may call an instruction stored in the storage medium, and as a device capable of operating according to the called instruction, may include an electronic device (e.g., electronic device 100) according to embodiments. Based on the instruction being executed by the processor, the processor may directly or under the control of the processor perform a function corresponding to the instruction using different elements. The instructions may include a code generated by a compiler or executed by an interpreter. The machine-readable storage media may be provided in the form of a non-transitory storage medium. Herein, "non-transitory" merely means that the storage medium is tangible and does not include a signal and does not distinguish that data is semi-permanently or temporarily stored in the storage medium.

According to an embodiment, a method according to one or more embodiments may be provided in a computer program product. The computer program product may be exchanged between a seller and a purchaser as a commodity. The computer program product may be distributed in the form of a machine-readable storage medium (e.g., a compact disc read only memory (CD-ROM)) or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

Each of the elements (e.g., a module or a program) according to various embodiments may be comprised of a single entity or a plurality of entities, and some sub-elements from among the abovementioned sub-elements may be omitted, or different sub-elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in parallel, repetitively, or in a heuristically manner, or at least some operations may be performed in a different order, omitted or a different operation may be added.

What is claimed is:

1. A control method of an electronic device, the method comprising:

based on a fall event of a user being detected by one from among a plurality of sensors comprised in an external device, receiving fall information obtained by a plurality of sensors in the external device;

identifying whether or not a fall of the user has occurred by using fall information obtained by the plurality of sensors;

identifying a sensor that erroneously identified whether or not a fall has occurred from among the plurality of sensors based on whether or not a fall of the user has occurred; and retraining an artificial intelligence model that identifies whether or not a fall has occurred by using a sensing value obtained by the sensor which erroneously identified whether or not a fall has occurred.

2. The method of claim 1, wherein the external device comprises a first sensor and a second sensor, and wherein the receiving comprises, based on a fall event being detected based on at least one from among a first fall information obtained by inputting a sensing value obtained by the first sensor to a first artificial intelligence model and a second fall information obtained by inputting a sensing value obtained by the second sensor to a second artificial intelligence model, receiving the first fall information and the second fall information through the communicator.

3. The method of claim 2, wherein the identifying whether or not a fall of the user has occurred comprises identifying whether or not a fall of the user has occurred by using fall information obtained by a sensor with high accuracy from among the first sensor and the second sensor.

4. The method of claim 2, wherein the identifying whether or not a fall of the user has occurred comprises:
obtaining information on whether or not an electronic device is in operation in a space the user is located; and
identifying whether or not a fall of the user has occurred based on the first fall information, the second fall information and information on whether or not the electronic device is in operation.

5. The method of claim 2, wherein the retraining comprises:
based on the first sensor being identified as the sensor that erroneously identified whether or not a fall has occurred, retraining the first artificial intelligence model; and
based on the second sensor being identified as the sensor that erroneously identified whether or not a fall has occurred, retraining the second artificial intelligence model.

6. The method of claim 1, further comprising:
transmitting the retrained artificial intelligence model to the external device.

7. The method of claim 1, comprising:
transmitting the retrained artificial intelligence model to another external device which includes the sensor that erroneously identified whether or not the fall has occurred.

8. The method of claim 1, wherein the plurality of sensors comprises at least one from among a video sensor, an ultra-wide band (UWB) radar sensor, an infrared (IR) sensor, and a microphone.

9. An electronic device, comprising:
a communicator;
a memory comprising at least one instruction;
a processor coupled with the communicator and the memory and configured to control the electronic device,
wherein the processor, by executing the at least one instruction, is configured to:
based on a fall event of a user being detected by one from among a plurality of sensors comprised in an external device, receive fall information obtained by a plurality of sensors in the external device through the communicator;
identify whether or not a fall of the user has occurred by using fall information obtained by the plurality of sensors;
identify a sensor that erroneously identified whether or not a fall has occurred from among the plurality of sensors based on whether or not a fall of the user has occurred; and
retrain an artificial intelligence model that identifies whether or not a fall has occurred by using a sensing value obtained by the sensor which erroneously identified whether or not a fall has occurred.

10. The electronic device of claim 9, wherein the external device comprises a first sensor and a second sensor, and
wherein the processor is configured to,
based on a fall event being detected based on at least one from among a first fall information obtained by inputting a sensing value obtained by the first sensor to a first artificial intelligence model and a second fall information obtained by inputting a sensing value obtained by the second sensor to a second artificial intelligence model, receive the first fall information and the second fall information through the communicator.

11. The electronic device of claim 10, wherein the processor is configured to identify whether or not a fall of the user has occurred by using fall information obtained by a sensor with high accuracy from among the first sensor and the second sensor.

12. The electronic device of claim 10, wherein the processor is configured to:
obtain information on whether or not an electronic device is in operation in a space the user is located; and
identify whether or not a fall of the user has occurred based on the first fall information, the second fall information and information on whether or not the electronic device is in operation.

13. The electronic device of claim 10, wherein the processor is configured to:
based on the first sensor being identified as a sensor that erroneously identified whether or not a fall has occurred, retrain the first artificial intelligence model; and
based on the second sensor being identified as a sensor that erroneously identified whether or not a fall has occurred, retrain the second artificial intelligence model.

14. The electronic device of claim 9, wherein the processor is configured to control the communicator to transmit the retrained artificial intelligence model to the external device.

15. A non-transitory computer readable recording medium comprising a program for executing a control method of an electronic device, the method comprising:
based on a fall event of a user being detected by one from among a plurality of sensors comprised in an external device, receiving fall information obtained by a plurality of sensors in the external device;
identifying whether or not a fall of the user has occurred by using fall information obtained by the plurality of sensors;
identifying a sensor that erroneously identified whether or not a fall has occurred from among the plurality of sensors based on whether or not a fall of the user has occurred; and
retraining an artificial intelligence model that identifies whether or not a fall has occurred by using a sensing value obtained by the sensor which erroneously identified whether or not a fall has occurred.

* * * * *